United States Patent [19]

Yamamoto et al.

[11] Patent Number: 5,252,678
[45] Date of Patent: Oct. 12, 1993

[54] PROCESS FOR PRODUCING ACRYLIC ELASTOMER

[75] Inventors: Yuichi Yamamoto, Kitaibaraki; Kazuma Yokoi, Takahagi; Haruyoshi Tatsu, Hitachi, all of Japan

[73] Assignee: Nippon Mektron Limited, Tokyo, Japan

[21] Appl. No.: 966,845

[22] Filed: Oct. 27, 1992

Related U.S. Application Data

[60] Division of Ser. No. 728,892, Jul. 11, 1991, Pat. No. 5,194,540, which is a continuation of Ser. No. 489,975, Mar. 7, 1990, abandoned.

[30] Foreign Application Priority Data

Apr. 11, 1989 [JP] Japan .................................. 1-91083

[51] Int. Cl.$^5$ ............................ C08F 8/08; C08F 2/38; C08F 4/34
[52] U.S. Cl. ................................. 525/387; 525/328.9; 525/330.3; 526/222; 526/223; 526/224; 526/230.5; 526/232; 526/320; 526/329.6
[58] Field of Search .................. 525/328.9, 330.3, 387; 526/222, 223, 224, 230.5, 232, 320, 329.6

[56] References Cited

U.S. PATENT DOCUMENTS 2,396,997  3/1946  Fryling ............................... 526/224
4,119,657 10/1978  Komai ................................ 558/263

FOREIGN PATENT DOCUMENTS 62-96507  5/1987  Japan .

Primary Examiner—Joseph L. Schofer
Assistant Examiner—R. H. Delmendo
Attorney, Agent, or Firm—Lowe Price LeBlanc & Becker

[57] ABSTRACT

An acrylic elastomer capable of giving a vulcanization product having a distinguished tensile strength and a good stretching even by cross-linking with an organic peroxide can be obtained by using an organic peroxide having a non-conjugated double bond as a polymerization initiator in polymerization of at least one of (a) alkyl acrylates having an alkyl group of 1 to 8 carbon atoms and (b) alkoxyalkyl acrylates having an alkoxylalkyl group of 2 to 8 carbon atoms.

11 Claims, 1 Drawing Sheet

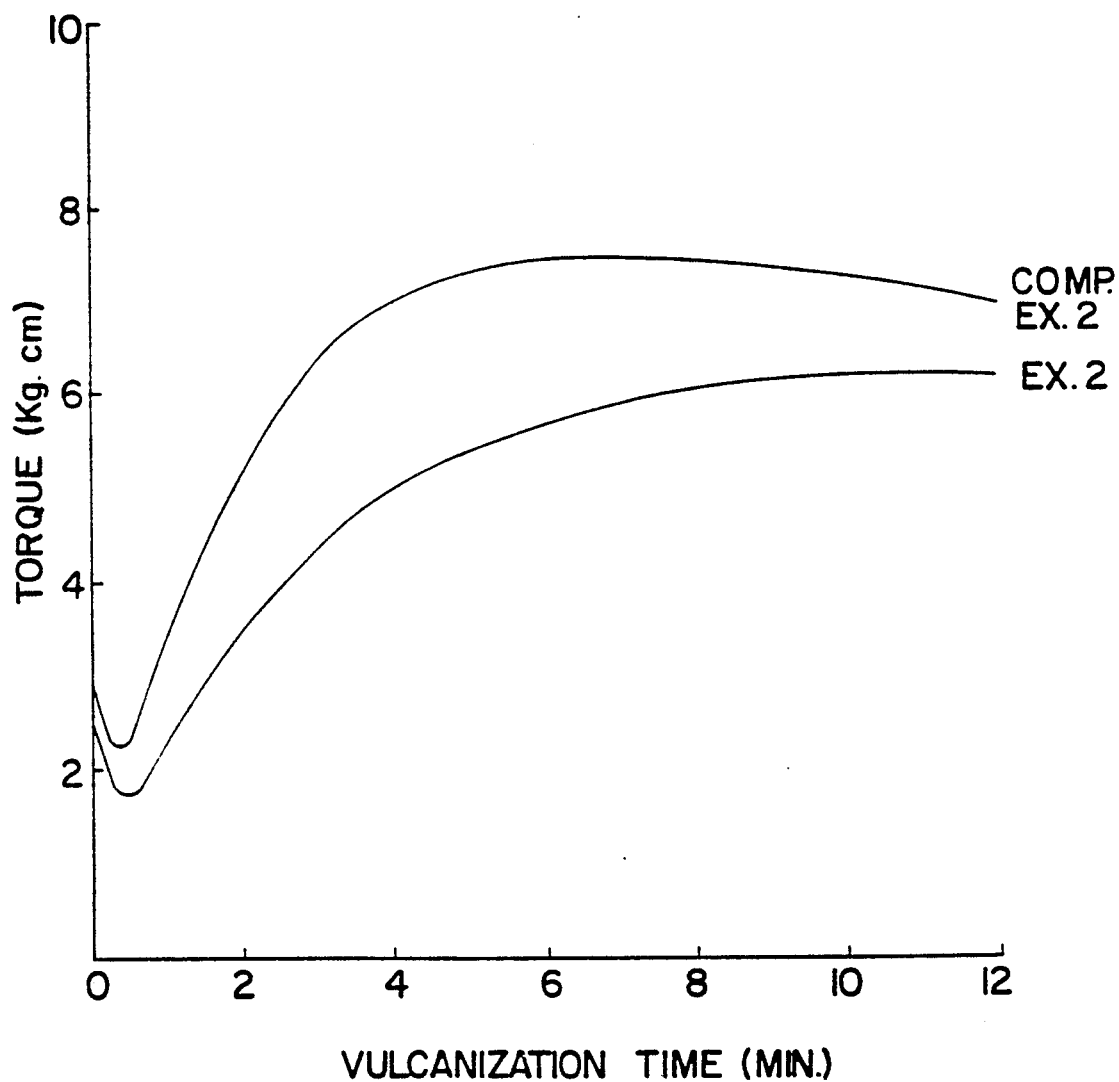

PROCESS FOR PRODUCING ACRYLIC ELASTOMER

This is a division of application Ser. No. 07/728,892, filed Jul. 11, 1991, now U.S. Pat. No. 5,194,540, which is a continuation of 07/489,975, filed Mar. 7, 1990, now abandoned and the benefits of 35 USC 120 are claimed relative to it.

BACKGROUND OF THE INVENTION

1. Field of the Invention

This invention relates to a process for producing an acrylic elastomer, and more particularly to a process for producing an acrylic elastomer cross-linkable with an organic peroxide.

2. Description of the Prior Art

Acrylic elastomers comprising polymers of acrylic acid esters are usually subjected to copolymerization with polyfunctional monomers serving as cross-linking points because the acrylic elastomers have no double bonds in the main chain. When the acrylic elastomers are copolymerized with polyfunctional monomers capable of introducing double bonds into the main chains of the resulting copolymers and when the resulting copolymers are cross-linked with an organic peroxide, the resulting vulcanization product is inferior in the tensile strength and stretching than other vulcanization products and thus needs further improvements in these respects.

SUMMARY OF THE INVENTION

An object of the present invention is to provide a process for producing an acrylic elastomer capable of giving a vulcanization product having a distinguished tensile strength and a good stretching even if cross-linked with an organic peroxide.

DETAILED DESCRIPTION OF THE PREFERRED EMBODIMENTS

Production of acrylic elastomer that can attain the object of the present invention is carried out by using an organic peroxide having a non-conjugated double bond as a polymerization initiator in the polymerization of at least one of (a) alkyl acrylates having an alkyl group of 1 to 8 carbon atoms and (b) alkoxyalkyl acrylates having an alkoxyalkyl group of 2 to 8 carbon atoms as polymerizable monomers.

Alkyl acrylates as component (a) for forming the acrylic elastomer include such alkyl acrylates having an alkyl group of 1 to 8 carbon atoms (including alkyl groups containing a substituent group such as a cyano group, etc.) as methyl acrylate, ethyl acrylate, n- or iso-propyl acrylate, n- or iso-butyl acrylate, n-amyl acrylate, n-hexyl acrylate, 2-ethylhexyl acrylate, n-octyl acrylate, 2-cyanoethyl acrylate, etc., and it is preferable to use ethyl acrylate or n-butyl acrylate.

Alkoxyalkyl acrylates as component (b) include such alkoxyalkyl acrylates having an alkoxyalkyl group of 2 to 8 carbon atoms as methoxymethyl acrylate, ethoxymethyl acrylate, 2-methoxyethyl acrylate, 2-ethoxyethyl acrylate, 2-butoxyethyl acrylate, etc., and it is preferable to use 2-methoxyethyl acrylate or 2-ethoxyethyl acrylate.

Both components (a) and (b) are used together usually in a ratio of component (a) to component (b) of about 10—about 90 to about 90—about 10 by mole.

A portion, that is, up to about 20% by weight, of at least one of components (a) and (b) can be substituted with other copolymerizable monomer. Such copolymerizable monomer includes, for example, vinyl chloride, vinylidene chloride, acrylonitrile, styrene, vinyl acetate, ethyl vinyl ether, butyl vinyl ether, alkyl methacrylate, alkoxyalkyl methacrylate, etc.

Furthermore, a portion, that is, up to about 10% by weight, of at least one of components (a) and (b) can be substituted and copolymerized with a dienic monomer. Such dienic monomer includes, for example, divinylbenzene, piperylene, isoprene, pentadiene, vinyl cyclohexene, chloroprene, butadiene, methyl butadiene, cyclopentadiene, methyl pentadiene, ethyleneglycol diacrylate, propyleneglycol diacrylate, ethyleneglycol dimethacrylate, propyleneglycol dimethacrylate, etc.

In the present invention, polymerization reaction of at least one of components (a) and (b) is carried out by using about 0.01 to about 10% by weight, preferably about 0.05 to about 3% by weight on the basis of the polymerizable monomers, of an organic peroxide having a non-conjugated double bond as a polymerization initiator.

As the organic peroxide having a non-conjugated double bond, compounds having the following formulae (c) and (c') can be used:

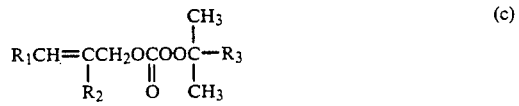

wherein $R_1$ and $R_2$ is H or $CH_3$ and $R_3$ is H or an alkyl group of 1 to 12 carbon atoms. The compounds include, for example, t-butylperoxyallyl-carbonate, t-butylperoxymethacrylate, t-butylperoxycrotonate, isopropylperoxyallylcarbonate, etc.

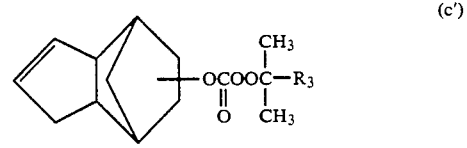

wherein $R_3$ is H or an alkyl group of 1 to 12 carbon atoms. The compounds include, for example, t-butylperoxydihydrodicyclopentenyl, etc.

It is desirable to use not more than about 5% by weight, preferably about 0.001 to about 1% by weight on the basis of the polymerizable monomers, of an organic mercapto compound or organic sulfide compound having a non-conjugated double bond as a molecular weight-controlling agent, together with the organic peroxide.

As the organic mercapto compound having a non-conjugated double bond, compounds having the following formulae (d) and (d') can be used.

wherein $R_1$ and $R_2$ are H or $CH_3$. The compounds include, for example, allylmercaptan.

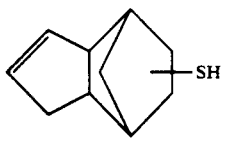

(d')

As the organic sulfide compound having a non-conjugated double bond, compounds having the following formulae (e) and (e') can be used.

$$(R_1 CH=CR_2 CH_2 S)_2 \qquad (e)$$

wherein $R_1$ and $R_2$ are H or $CH_3$. The compounds include, for example, allyl disulfide,

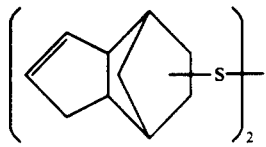

(e')

dihydrodicyclopentenyl disulfide

Polymerization reaction is carried out in the presence of the organic peroxide, preferably together with the organic mercapto compound by any of polymerization methods including emulsion polymerization method, suspension polymerization method, solution polymerization method, bulk polymerization method, etc., preferably by emulsion polymerization method. The polymerization initiator can be used also as a redox system.

The reaction is carried out at a temperature of about $-10°$ to about $100°$ C., preferably about $2°$ to about $80°$ C. in a batch-wise, continuous or intermittent fead system. After the completion of reaction, the formed polymers are recovered by separation, dependent upon the type of employed polymerization method, for example, by adding a coagulating agent such as acid or polyvalent metal salts, etc. to the reaction mixture in case of emulsion polymerization method or suspension polymerization method, and the recovered polymers are then washed and dried, and then subjected to cross-linking with an organic peroxide.

In the cross-linking reaction, about 0.5 to about 10 parts by weight of such an organic peroxide as ordinary organic peroxide, for example, t-butyl peroxide, dicumyl peroxide, 2,5-dimethyl-2,5-di(t-butylperoxy) hexane, 1,3-bis (t-butylperoxyisopropyl)benzene, etc., preferably 1,3-bis (t-butylperoxyisopropyl)benzene, is used per 100 parts by weight of acrylic polymer.

In the preparation of a vulcanizable composition, a polyfunctional compound such as triallyl isocyanurate, triallyl cyanurate, N,N'-m-phenylenebismaleimide, etc., a lubricant such as stearic acid, etc., various carbon black reinforcing fillers, an antioxidant, etc. can be added to the composition, if required. When about 0.01 to about 10 parts by weight, preferably about 0.05 to about 2 parts by weight, of the following various phenols, thiols and sulfides are added thereto per 100 parts by weight of acrylic elastomer, the tensile strength can be improved.

Examples of monophenols:
2,6-di-t-butyl-4-methylphenol
2,6-di-t-butyl-4-ethylphenol
Examples of bisphenols:
2,2'-methylenebis(4-ethyl-6-t-butylphenol)
2,2'-methylenebis(4-methyl-6-t-butylphenol)
4,4'-butylidenebis(3-methyl-6-t-butylphenol)
4,4'-thiobis(3-methyl-6-t-butylphenol)
Examples of polyphenols:
2,5-di-t-butylhydroquinone
2,5-di-t-amylhydroquinone
Examples of thiols:
2-mercaptobenzimidazole and its zinc salt
2-mercaptomethylbenzimidazole and its zinc salt
Examples of sulfides:
dibenzothiazyl disulfide
2-mercaptobenzothiazole and its zinc salt
2-(4'-morpholinodithio)benzothiazole
tetrabutylthiuram disulfide
tetramethylthiuram disulfide A cross-linkable composition is prepared by adding necessary additives to a mixture of acrylic elastomers and an organic peroxide cross-linking agent, and mixing the mixture by kneading in a roll mill or by dispersion in a solvent such as benzene, toluene, xylene, methyl ethyl ketone, methyl isobutyl ketone, etc., followed by vaporization of the solvent, and then the thus obtained cross-linkable composition is cross-linked under the ordinary cross-linking conditions.

Vulcanization products using the acrylic elastomers obtained according to the present process using an organic peroxide having a non-conjugated double bond as a polymerization initiator are better in the scorch time, tensile strength and stretching than the vulcanization products using the conventional acrylic copolymers by introducing cross-linkable groups into the copolymers and cross-linking the copolymer with an ordinary organic peroxide, as shown by comparison of Example 1 (composition formula A) with Comparative Example 1 and of Example 2 (composition formula B) with Comparative Examples 2 and 3.

BRIEF DESCRIPTION OF THE DRAWING

Single FIGURE is a graph showing curastometer vulcanization curves in Example 2 and Comparative Example 2.

PREFERRED EMBODIMENTS OF THE INVENTION

The present invention will be described in detail below, referring to Examples and Comparative Examples, where parts are by weight.

EXAMPLE 1

150 parts of water, 0.1 part of sodium sulfate, 5.5 parts of an emulsifier mixture (1.5:2:2) of Emal 10, Emalgen 147 and Levenol WZ (trademarks of products all made by Kao K. K., Japan) and a monomer mixture consisting of 99 parts of ethyl acrylate and 1 part of acrylonitrile were charged into a separable flask provided with a thermometer, a stirrer, a nitrogen inlet tube and a pressure-reducing device, and after repetitions of degassing and displacement with nitrogen to thoroughly remove the oxygen from the system, a polymerization initiator mixture consisting of 0.16 parts of sodium hydrosulfite, 0.16 parts of sodium formaldehyde sulfoxylate and 0.16 parts of t-butylperoxyallylcarbonate was added thereto to start polymerization reaction at room temperature. The reaction was continued for 6 hours so that the polymerization conversion falled within a range of 95 to 98%, and then the reaction mixture was salted out and the precipitates were thoroughly washed with water and dried, whereby copolymer elastomers were obtained.

EXAMPLE 2

Polymerization was carried out in the same manner as in Example 1, except that the following monomer mixture was used in place of the monomer mixture of Example 1.

| Ethyl acrylate | 42 parts |
|---|---|
| n-Butyl acrylate | 27 parts |
| Methoxyethyl acrylate | 30 parts |
| Acrylonitrile | 1 part |

EXAMPLE 3

Polymerization was carried out in the same manner as in Example 2, except that 0.05 parts of vinyl cinnamate was added to the monomer mixture of Example 2 and 0.01 part of allyl mercaptan was added to the polymerization initiator mixture of Example 2.

EXAMPLE 4

Polymerization was carried out in the same manner as in Example 2, except that the same amount of t-butylperoxyallylcrotonate was used in place of t-butylperoxyallylcarbonate in the polymerization initiator mixture of Example 2.

EXAMPLE 5

Polymerization was carried out in the same manner as in Example 3, except that the same amount of diallyl disulfide was used in place of allyl mercaptan in the polymerization initiator mixture.

COMPARATIVE EXAMPLE 1

Polymerization was carried out in the same manner as in Example 1, except that the following polymer mixture consisting of:

| Ethyl acrylate | 99 parts |
|---|---|
| Acrylonitrile | 1 part |
| Allyl methacrylate | 0.05 parts | and the following polymerization initiator mixture consisting of:

| Sodium hydrosulfite | 0.01 part |
|---|---|
| Sodium formaldehydesulfoxylate | 0.002 parts |
| t-Butylhydroperoxide | 0.005 parts | were used in place of the monomer mixture and the polymerization initiator mixture of Example 1, respectively.

COMPARATIVE EXAMPLE 2

Polymerization was carried out in the same manner as in Comparative Example 1, except that the following monomer mixture consisting of:

| Ethyl acrylate | 42 parts |
|---|---|
| n-Butyl acrylate | 27 parts |
| Methoxyethyl acrylate | 30 parts |
| Acrylonitrile | 1 part |
| Vinyl cinnamate | 0.2 parts | was used in place of the monomer mixture of Comparative Example 1.

COMPARATIVE EXAMPLE 3

Polymerization was carried out in the same manner as in Comparative Example 2, except that the same amount of dihydrodicyclopentenyl acrylate was used in place of vinyl cinnamate in the monomer mixture of Comparative Example 2.

Acrylic elastmers obtained in the foregoing Examples and Comparative Examples were made into various compositions by roll mill kneading, as given in Table 1.

TABLE 1

| Composition (parts by weight) | A | B | C | D | E |
|---|---|---|---|---|---|
| Acrylic elastmer | 100 | 100 | 100 | 100 | 100 |
| Stearic acid | 1 | 1 | 1 | 1 | 1 |
| FEF Carbon black | 50 | 60 | 50 | 60 | 60 |
| Substituted diphenylamine antioxidant (Nogard 445, made by Uniroyal) | 2 | 2 | 2 | 2 | 2 |
| α, α'-bis(t-butylperoxy-m-isopropyl)-benzene | 1.5 | 1.5 | 1.5 | 1.5 | 1.5 |
| N, N'-m-phenylenebismaleimide | 4.5 | 4.5 | 4.5 | 4.5 | 4.5 |
| 2, 2'-methylenebis(4-methyl-6-t-butyl-phenol) | | | 0.1 | 0.1 | 0.2 |
| 2-mercaptobenzimidazole | | | 0.1 | 0.1 | 0.2 |

These compositions were subjected to press vulcanization at 170° C. for 8 minutes and then to oven vulcanization at 175° C. for 4 hours, and normal physical properties, compression set (150° C., 70 hr, 25% compression) and scorch time (t$_5$, 121° C.) of the resulting vulcanization products were measured. The results are shown in Table 2 together with the type of employed acrylic elastomers and composition formulae.

TABLE 2

| No. | 1 | 2 | 3 | 4 | 5 | 6 | 7 | 8 | 9 | 10 | 11 | 12 | 13 |
|---|---|---|---|---|---|---|---|---|---|---|---|---|---|
| Acrylic elastomer | Ex. 1 | Ex. 1 | Ex. 2 | Ex. 2 | Ex. 3 | Ex. 3 | Ex. 4 | Ex. 4 | Ex. 5 | Ex. 5 | Comp. Ex. 1 | Comp. Ex. 2 | Comp. Ex. 3 |
| Composition formulae | A | C | B | D | B | E | B | D | B | E | A | B | B |
| Hardness (JIS-A) | 69 | 68 | 66 | 67 | 69 | 69 | 67 | 68 | 69 | 69 | 72 | 71 | 70 |
| 100% modulus (kg/cm$^2$) | 50 | 52 | 43 | 45 | 48 | 50 | 46 | 47 | 49 | 50 | 60 | 58 | 57 |
| Tensile strength (kg/cm$^2$) | 140 | 147 | 105 | 125 | 110 | 128 | 106 | 124 | 109 | 126 | 118 | 95 | 100 |
| Stretching (%) | 250 | 259 | 200 | 210 | 190 | 200 | 205 | 212 | 188 | 200 | 145 | 149 | 144 |
| Compression set (%) | 18 | 19 | 16 | 15 | 14 | 13 | 15 | 14 | 14 | 13 | 17 | 15 | 13 |
| Scorch time (min.) | 20.0 | 23.5 | 19.8 | 22.0 | 18.0 | 21.0 | 20.5 | 22.8 | 18.5 | 21.2 | 8.0 | 7.8 | 8.0 |

Curastometer vulcanization curves were determined for the composition formula B of Example 2 and Comparative Example 2. The results are shown in Single Figure. In Comparative Example 2, torque was decreased with time, whereas in Example 2 no such behavior was found at all.

What is claimed is:

1. A process which comprises polymerizing an alkyl acrylate having an alkyl group of 1 to 8 carbon atoms and an alkoxyalkyl acrylate having an alkoxylalkyl group of 2 to 8 carbon atoms as polymerizable monomers with an organic peroxide having a non-conjugated double bond as a polymerization initiator, which peroxide is a compound represented by the formula

wherein $R_3$ is a hydrogen atom or an alkyl group having 1 to 12 carbon atoms.

2. A process according to claim 1 wherein an organic mercapto or organic sulfide compound having a double bond is used as a molecular weight-controlling agent together with said organic peroxide as a polymerization initiator.

3. A process according to claim 2 wherein said organic mercapto compound is a compound having the formula $$R_1CH\!=\!CR_2CH_2SH$$

wherein $R_1$ and $R_2$ are a hydrogen atom or a methyl group.

4. A process according to claim 2 wherein said organic mercapto compound is dihydrodicyclopentenyl mercaptan.

5. A process according to claim 2 wherein said organic sulfide compound is a compound having the formula $$(R_1CH\!=\!CR_2CH_2S)_2$$

wherein $R_1$ and $R_2$ are a hydrogen atom or a methyl group.

6. A process according to claim 2 wherein said organic sulfide compound is dihydrodicyclopentenyl disulfide.

7. A process according to claim 2 wherein said organic mercapto or organic sulfide compound is used in an amount of not more than 5% by weight on the basis of the polymerizable monomers.

8. A process according to claim 2 wherein said organic mercapto or organic sulfide compound is used in an amount of about 0.001 to about 1% by weight on the basis of polymerizable monomers.

9. A process according to claim 1 wherein the organic peroxide as a polymerization initiator is used in an amount of about 0.01 to about 10% by weight on the basis of the polymerizable monomers.

10. A process according to claim 1 wherein the organic peroxide as a polymerization initiator is used in an amount of about 0.05 to about 3% by weight on the basis of the polymerizable monomers.

11. A process according to claim 1 which comprises further subjecting the resulting copolymer to crosslinking with an organic peroxide.

* * * * *